(12) United States Patent
Beller et al.

(10) Patent No.: US 6,646,726 B2
(45) Date of Patent: Nov. 11, 2003

(54) OPTICAL MEASURING DEVICE WITH IMAGING UNIT

(75) Inventors: Josef Beller, Tuebingen (DE); Peter Schweiger, Mississauga (CA)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 10/093,982

(22) Filed: Mar. 8, 2002

(65) Prior Publication Data

US 2003/0030787 A1 Feb. 13, 2003

(30) Foreign Application Priority Data

Aug. 11, 2001 (EP) .............................................. 01119407

(51) Int. Cl.$^7$ .............................................. G01N 21/00
(52) U.S. Cl. ..................................................... 356/73.1
(58) Field of Search .............................. 356/73.1, 237.2; 382/141, 108, 281, 147

(56) References Cited

U.S. PATENT DOCUMENTS

| | | | | |
|---|---|---|---|---|
| 4,648,053 A | * | 3/1987 | Fridge | 382/147 |
| 5,179,419 A | | 1/1993 | Palmquist et al. | 356/73.1 |
| 6,011,623 A | * | 1/2000 | MacDonald et al. | 356/519 |

FOREIGN PATENT DOCUMENTS

JP        07218385        8/1995

* cited by examiner

*Primary Examiner*—Richard A. Rosenberger
*Assistant Examiner*—Vincent P. Barth

(57) ABSTRACT

An optical measuring device for measuring in a fiber optic network, comprises a measuring unit for performing the measurement in the fiber optic network, a processing unit for processing the measuring results from the measuring unit, and a display for visualizing the processed measuring results. The processing unit further receives imaging signals provided by an imaging unit and processes such imaging signals to be displayed by the display.

15 Claims, 3 Drawing Sheets

OPTICAL MEASURING DEVICE WITH IMAGING UNIT

BACKGROUND OF THE INVENTION

The present invention relates to testing in fiber optic networks.

Optical fiber connections are generally very susceptible for contamination, dirt, scratches and so on, which can cause faults, such as increased bit error rate, signal degradation, or higher insertion losses. A visual inspection of fiber connectors might therefore be applied. Typically, such visual inspection is carried out using an electronic video microscope consisting of camera unit, monitor, and battery pack. Various devices and methods for surface analysis are disclosed e.g. in U.S. Pat. No. 5,809,162, U.S. Pat. No. 5,179,419, or JP-A-07 218385.

SUMMARY OF THE INVENTION

It is an object of the present invention to provide an improved visual inspection for fiber connections. The object is solved by the independent claims. Preferred embodiments are shown by the dependent claims.

According to the present invention, an optical measuring device for measuring in fiber optic networks comprises a measuring unit for carrying out the measurement, a processing unit for processing measuring results, and a display for visualizing processed measuring results. The optical measuring device further comprises an imaging unit for providing imaging signals preferably for allowing a visual inspection of fiber connections. The imaging unit is adapted to connect to the processing unit, which then allows processing the imaging signals so that they can be shown on the display.

In a preferred embodiment, the imaging unit is adapted to be used with different optical objectives, so that it can be used, for example, as microscope or as normal camera unit (e.g. allowing documentation for example of the measurement environment etc.). In one embodiment, the variation of different objective lens systems is achieved by allowing exchanging the objectives. In another embodiment, at least two different objectives are provided (e.g. in one unit), and it can be switched between those objectives.

The optical measuring device preferably is (or is based on) an optical time domain reflectometer (OTDR), a WDM-tester, a dispersion tester, or another fiber optic test equipment. In a preferred embodiment, the measuring device makes use of already existing testing units, whereby the imaging unit can be coupled thereto by means of interfaces (such as USB). The processing unit will be specifically adapted for providing the visualization of the imaging signals to the display. Such adaptation is preferably accomplished by adequate software programs and algorithms, whereby known imaging processing algorithms can be applied.

The invention thus allows utilizing resources for visual inspections, which are already at hand when providing measurements in fiber optic networks. Thus, additional optical inspection devices, such as electronic video microscope sets, are not required anymore and need not be carried around. In particular in field applications, additional and heavy microscopes have been shown as undesired burden for technical staff.

In a preferred embodiment, imaging signals as provided e.g. from an optical fiber connection will be subject to an image processing in order to detect faults. Such faults can be e.g. scratches, particles such as dirt, fluid films (such as oil films), etc. In a preferred embodiment, pattern recognition is provided in order to detect such faults.

In a next step, the imaging signals will be graphically represented, e.g. on a display, screen, or monitor, whereby a visualization of the detected faults is provided by representing such faults in accordance with a predefined coloring scheme. Preferably, different faults will be represented in different colors. In one embodiment, the imaging signals are provided as mono-color signals (preferably black and white signals) or at least with a limited color or gray scale information. The detected faults are then represented preferably in such colors that are not existing in the original imaging signals.

Thus, the invention provides an improved visual inspection of fiber connections, whereby faults will be readily visualized using a fault-coloring scheme. Preferably, a false-coloring scheme is applied, so that detected faults will be represented in non-real, arbitrary colors.

It is clear that the term "coloring scheme" is not limited to the application for different optical colors (such as red, yellow, or blue) but also covers mono-color shading e.g. in a black and white representation.

The invention can be partly embodied or supported by one or more suitable software programs, which can be stored on or otherwise provided by any kind of data carrier, and which might be executed in or by any suitable data processing unit. Software is preferably employed for processing the imaging signals.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
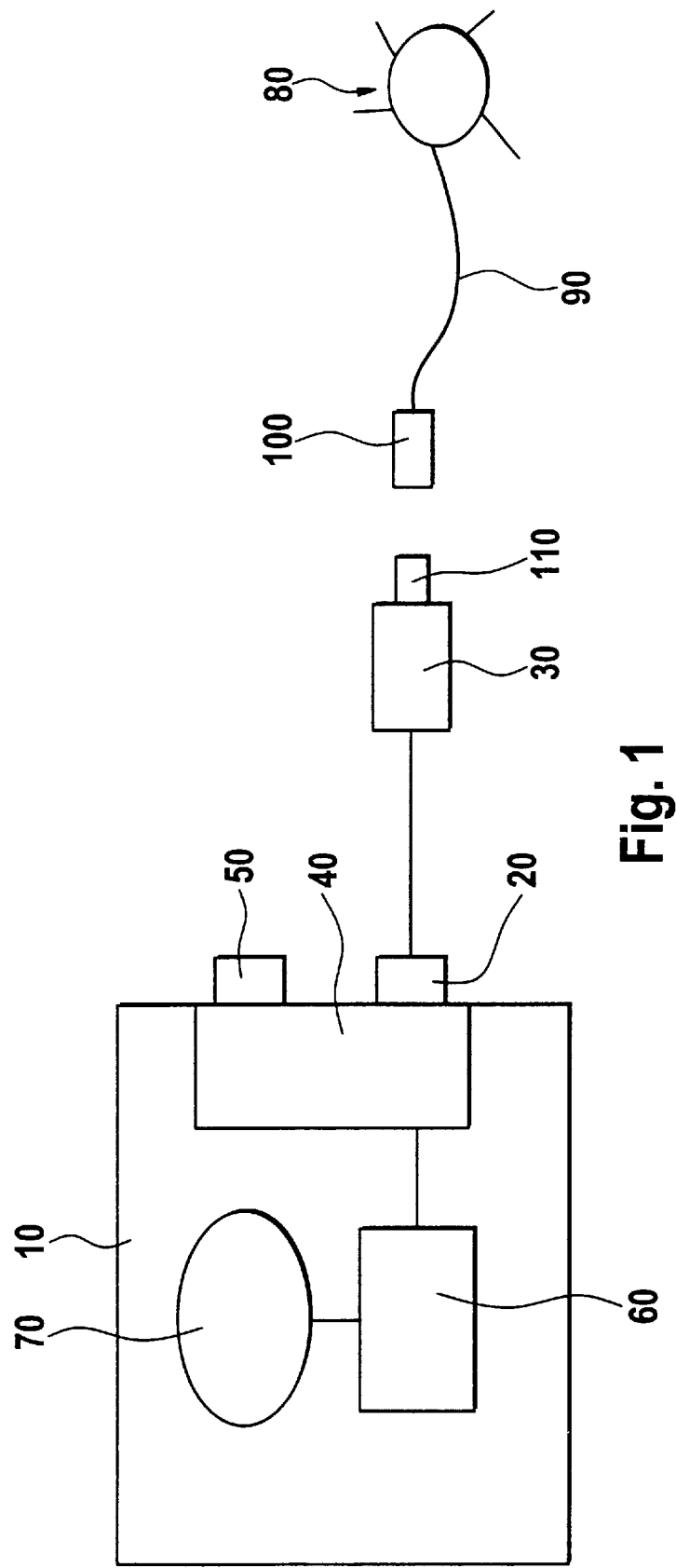
FIG. 1 shows a preferred embodiment according to the present invention.

In FIG. 1, an OTDR 10 is provided as measuring device having an interface 20, such as a standard USB interface, allowing coupling an imaging unit 30 to the OTDR 10. The OTDR 10 can be based on a conventional OTDR device such as an Agilent N3900A, E4310A, or E6000C as provided by the applicant Agilent Technologies.

The OTDR 10 comprises a measuring unit 40 adapted to provide measurements in a fiber optic network 80 consisting of one or more fibers and might further comprise optical components. The measuring unit coupled through a connection 50 to such fiber optic network 80 for performing the measurement. A processing unit 60 is coupled to the measuring unit 40 in order to provide a signal processing to measuring signals received from the measuring unit 40. Imaging signals provided from the imaging unit 30 are coupled through the measuring unit 40 or might be directly applied to the processing unit 60.

The processing unit receives the measuring signals acquired by the measurement unit 40 through the connection 50 from the fiber optic network 80 and/or the imaging signals as provided from the imaging unit 30, and processes such signals to be displayed by a display 70.

In operation, the OTDR 10 can be used in two ways. In a first operation mode, the OTDR 10 will be used to provide reflectometer measurements in the optical network 80. For that purpose, a fiber 90 coupled to the optical network 80 will be coupled to the connection 50, e.g. by means of a fiber connector 100. Such measurements are well known in the art and described in detail e.g. by the inventor in chapter 11 of the book 'Fiber Optic Test and Measurement' by Derickson Dennis, 1998, ISBN 0-13-534330.

In a second operation mode, the OTDR 10 can be used for providing a visual inspection of fibers or components of the optical network 80 and in particular of fiber connections. In this mode, the imaging unit 30 will provide imaging signals from such optical devices to be inspected, such as from the fiber connector 100 as shown in FIG. 1. The imaging unit 30 comprises an adequate objective 110 adapted for the specific inspection application. For fiber connection inspection, the imaging unit 30 is preferably provided as a video microscope camera allowing inspecting microscopic detail on the fiber connection. The processing unit 60 comprises suitable software algorithms allowing representing the imaging signals as gathered by the imaging unit 30 on the display 70.

The OTDR 10 can be operated in either one of the two operation modes as well as in a combined first and second operation mode allowing optical measurements and visual inspection concurrently.

Figure 2:
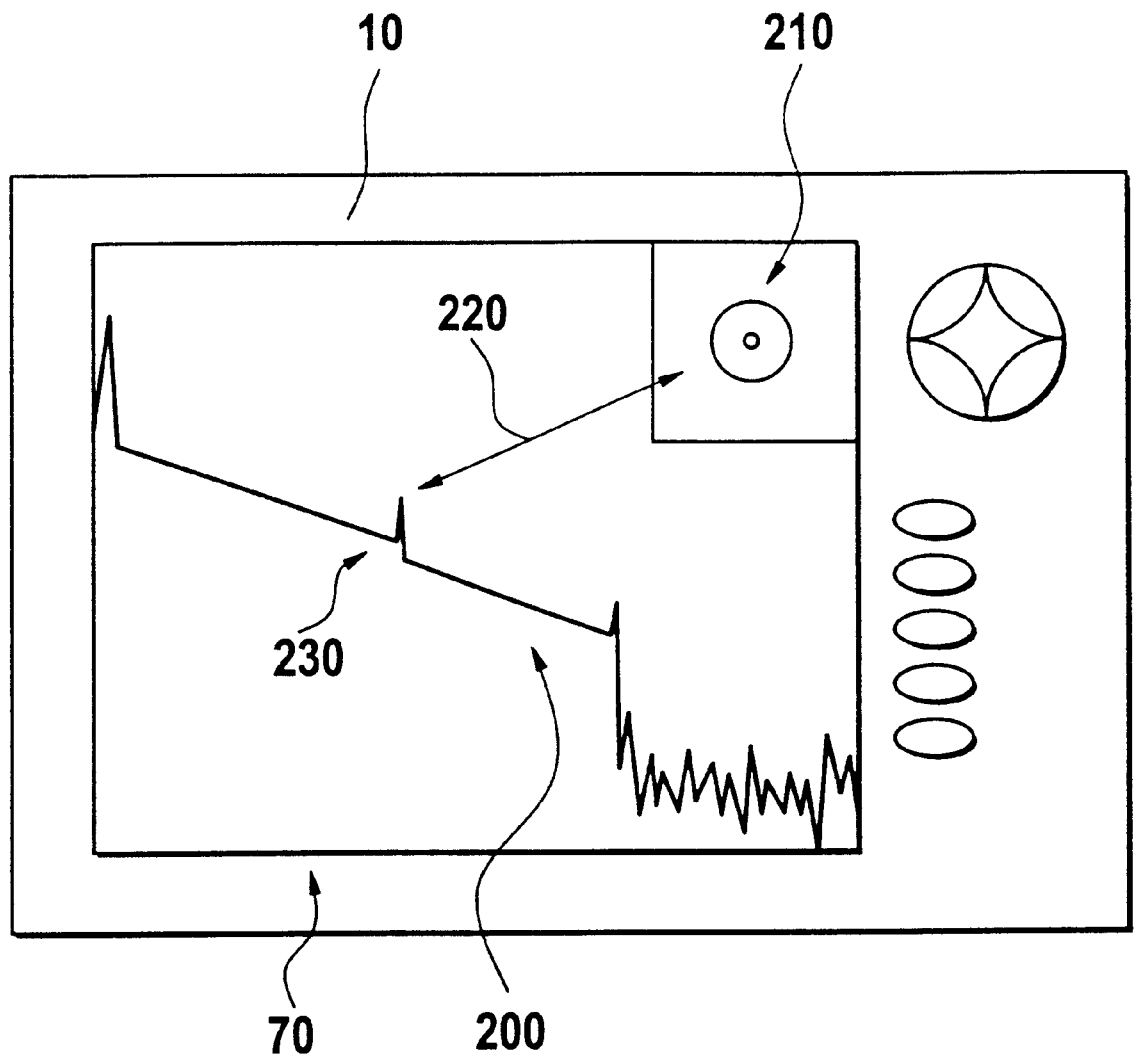
FIG. 2 shows an example for displaying optical measurement data and visual inspection information.

FIG. 2 shows an example for displaying optical measurement data and visual inspection information. For this example, a measurement of the optical network 80 has been provided by the measurement unit 40, and a measuring result in form of a so-called OTDR plot 200 will be displayed on the display 70. Before or after the measurement, a visual inspection of the fiber connector 100 has been made by means of the imaging unit 30. Picture 210 as displayed on the display 70 shows a front view of the fiber connector 100. Arrow 220 indicates that the picture 210 corresponds the event 230 in the OTDR trace.

Figure 3:
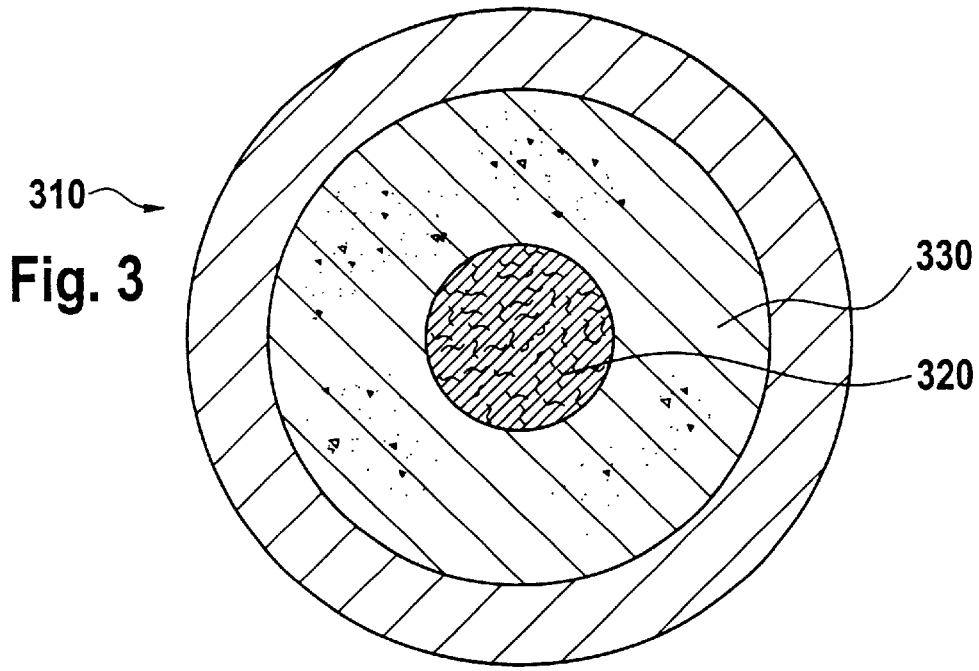
FIG. 3 shows an example of an image 310 as provided from an optical fiber connection.

FIG. 3 shows an example of an image 310 as provided from an optical fiber connection. The image 310 shows the surface of an optical connector with a fiber 320 in the center as a dark spot, and the metal connector ferule 330 surrounding it.

The image 310 will then be subject to image processing in order to detect faults (e.g. scratches, particles such as dirt, fluid films (such as oil films), etc.) in such fiber connection by using pattern recognition. These algorithms can be based e.g. on two-dimensional correlation procedures, or on n×n pixel data transformations, as well known in the art.

Figure 4:
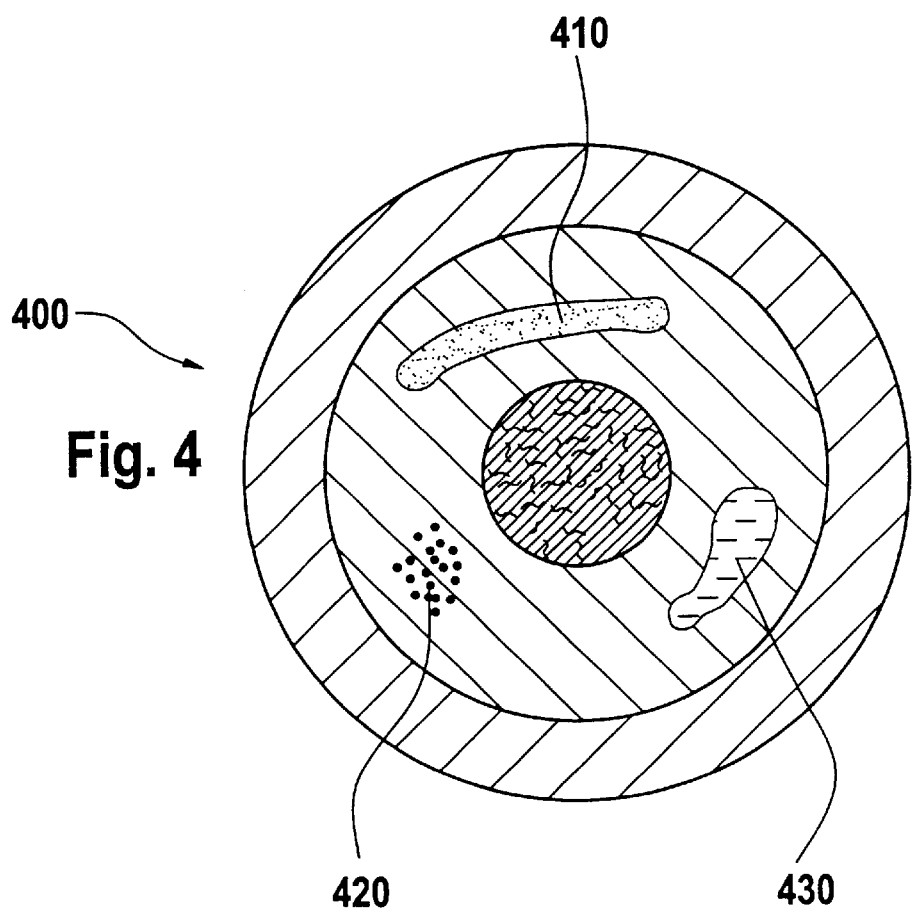
FIG. 4 shows an example of a processed image 400 with a visualization of the detected faults in accordance with the present invention.

FIG. 4 shows an example of a processed image 400 with a visualization of the detected faults. The processed image 400 shows three different kind of connector surface contamination, i.e. scratches 410, particles 420, and fluids 430, each represented using different coloring schemes. In the example of FIG. 4, a gray-scale coloring scheme is used, whereby each detected fault type 410, 420, 430 is represented by a different gray shading. The different faults may also be represented in different colors.

What is claimed is:

1. An optical measuring device adapted for measuring in a fiber optic network, comprising:

a measuring unit for performing a measurement of an optical property in the fiber optic network;

a processing unit for processing said measurement to provide a processed measurement, and for receiving and processing imaging signals to provide a processed image signal; and a display for visualizing said processed measurement and said processed image signal.

2. The optical measuring device of claim 1, wherein said measurement is selected from the group consisting of optical time domain reflectometer measurement, WDM measurement, and dispersion measurement.

3. The optical measuring device of claim 1, wherein the imaging signals represent information of a visual inspection of a fiber, a fiber connection, and/or an optical component in the fiber optic network.

4. An optical measuring device, comprising:

a measuring unit for performing a measurement of an optical property in, a fiber optic network;

an imaging unit for providing imaging signals from a fiber, a fiber connection, and/or an optical component in said fiber optic network;

a processing unit adapted for processing said measurement to provide a processed measurement, and for processing said imaging signal to provide a processed image signal, and a display for visualizing said processed measurement and said processed image signal.

5. The optical measuring device of claim 4, wherein the imaging unit is adapted to be used with different optical objectives.

6. The optical measuring device of claim 5, wherein the imaging unit is adapted to be used with at least one of a microscopic objective for providing microscopic details of a fiber connection or a normal objective for documenting the measurement environment.

7. The optical measuring device of claim 5, wherein the imaging unit comprises switching devices for switching between the optical objectives.

8. The optical measuring device of claim 1, wherein the processing unit is further adapted to processing the imaging signals in order to detect faults, and to provide a visualization of the detected faults by representing such faults in accordance with a predefined coloring scheme.

9. A method for measuring and visually inspecting a fiber optic network, wherein measuring comprises:

performing a measurement of an optical property in the fiber optic network, processing the measuring results, and visualizing the processed measuring results on a display, and inspecting comprises:

providing imaging signals from a fiber, a fiber connection, and/or an optical component in the fiber optic network, processing the received imaging signals, and visualizing the processed imaging signals on the display.

10. The method of claim 9, wherein processing the received image signals comprises a step of processing the imaging signals in order to detect faults in the fiber connection.

11. The method of claim 9, wherein visualizing the processed imaging signals comprises visualizing the detected faults by representing such faults in accordance with a predefined coloring scheme.

12. The method of claim 11, wherein different faults are represented in different colors or mono-color shadings.

13. The method of claim 11, wherein the detected faults are represented in such colors that are not existing in the original imaging signals.

14. The method of claim 9, wherein faults are any of scratches, particles, dust, smoke, dirt, fluid films, oil films.

15. The method of claim 9, wherein processing the received imaging signals comprises recognizing predefined image patterns in the imaging signals, whereby the predefined image patterns represent potential faults.

* * * * *